July 4, 1944.  W. L. REMICK  2,352,972
APPARATUS FOR AND METHOD OF SEPARATING MIXED MATERIALS
Filed Jan. 13, 1941  2 Sheets-Sheet 2

Patented July 4, 1944

2,352,972

UNITED STATES PATENT OFFICE 2,352,972

APPARATUS FOR AND METHOD OF SEPARATING MIXED MATERIALS

Walter L. Remick, Hazleton, Pa.

Application January 13, 1941, Serial No. 374,292

16 Claims. (Cl. 209—158)

My invention consists in a new and useful improvement in apparatus for and method of separating mixed materials, and is designed for separating materials of different sizes and different specific gravities, and is designed more particularly for the recovery of ores. My improved process comprises the segregation of overflow and underflow products by hydraulic separation. The particularly novel and useful features of my improved process are the vertical zoning of the fluid masses, and the treatment of the middling product thereby produced, whereby complete separation is effected.

While I have illustrated in the drawings filed herewith and have hereinafter fully described one specific embodiment of my improved apparatus by which my improved process can be practiced, it is to be distinctly understood that I do not consider my invention, as to my method and my apparatus, to be limited thereby, but refer for its scope to the claims appended hereto.

In the drawings:

Fig. 5 is a vertical section of a modified form of tank for my apparatus.

Figure 1:
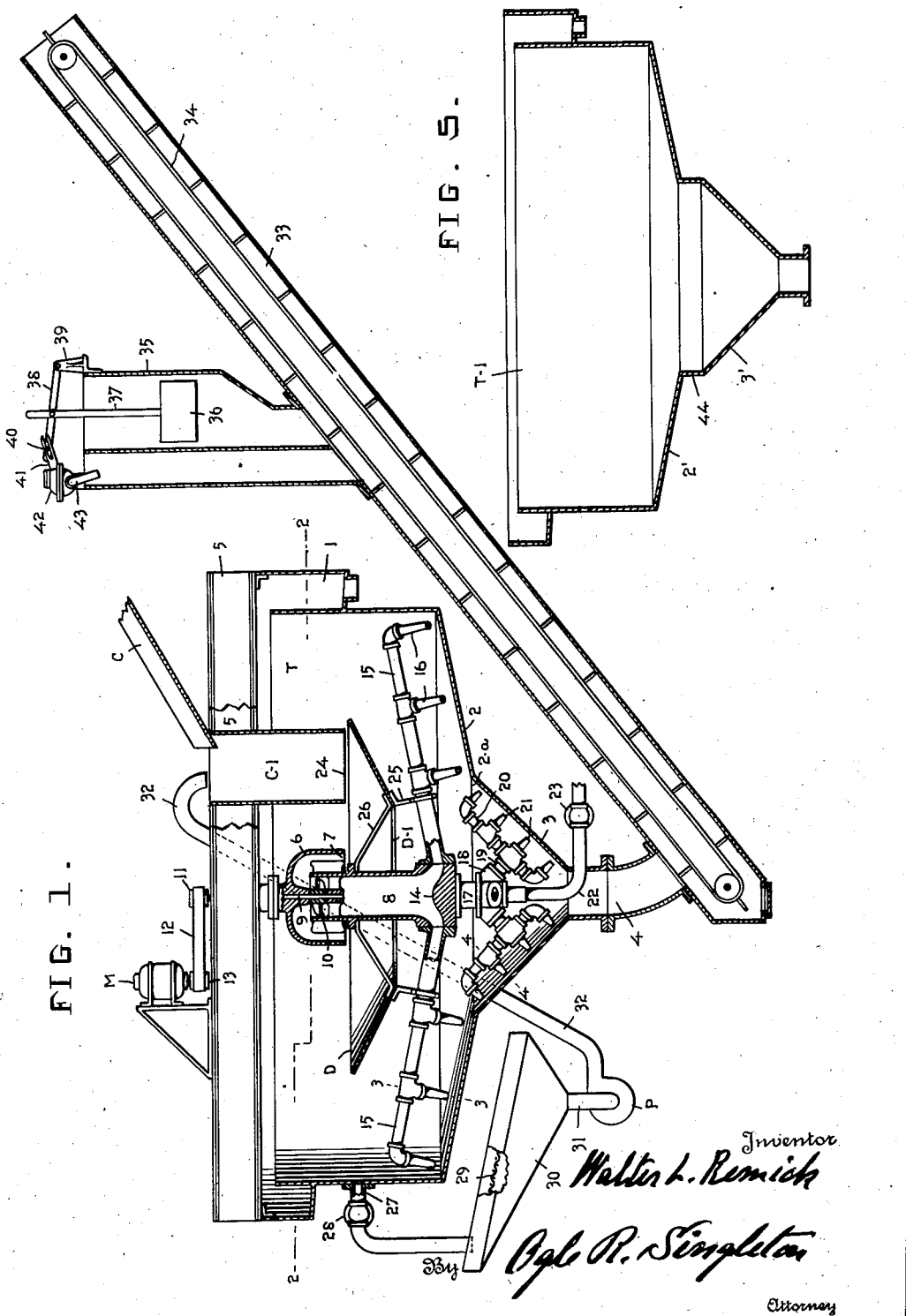
Fig. 1 is a vertical section of my improved apparatus.
Figure 2:
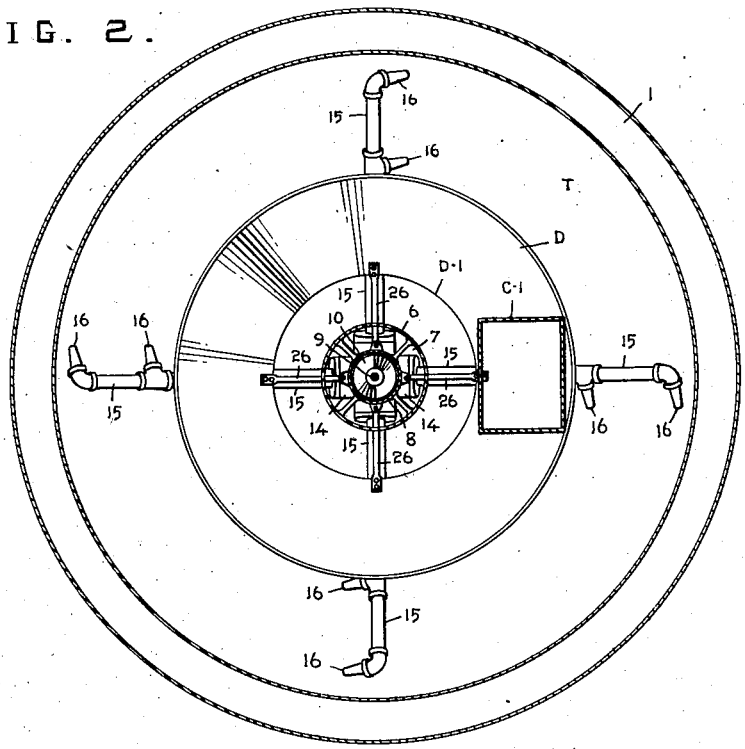
Fig. 2 is a horizontal section on the line 2—2 of Fig. 1.
Figure 3:
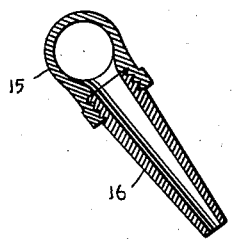
Fig. 3 is a vertical section on the line 3—3 of Fig. 1.
Figure 4:
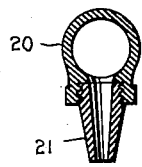
Fig. 4 is a vertical section on the line 4—4 of Fig. 1.

As illustrated in the drawings, my improved apparatus has the circular tank T with overflow launder 1, the annular downwardly sloping bottom 2, and the central inverted frusto-conical bottom 3 with the centrally disposed discharge conduit 4. Suitably mounted on the beams 5 over the tank T is the rotatable casing 6 having its open end 7 extended into the tank T. Suitably mounted in the casing 6 is the discharge pipe 8 in which is journaled the shaft 9 carrying the impeller 10. The shaft 9 passes through a journal in the casing 6, extends above the beams 5, and carries a pulley 11 driven by belt 12 about pulley 13 on the shaft of the motor M suitably mounted on the beams 5. The discharge pipe 8 has, at its lower end, a distributor head 14 to which are attached the radial pipes 15 having the downwardly extended tangential nozzles 16 disposed adjacent the bottom 2 of the tank T. A shaft 17 extends downwardly from the head 14, carrying the distributor head 18 disposed below the lower edge of the bottom 2, and having a series of downwardly extended pipes 19, each provided with a pipe 20 disposed parallel to the bottom 3. Each pipe 20 is provided with a series of nozzles 21 disposed at right angles to the bottom 3. A supply pipe 22, with valve 23, passes through conduit 4 into tank T and communicates with head 18.

To introduce the mixed materials into the tank T, I provide a feed chute C discharging into a feed spout C—1 suitably mounted on the beams 5 and extended downwardly into the tank T, its lower end 24 being in the horizontal plane of the opening 7 of casing 6. To receive the feed discharged from the spout C—1, I provide an annular downwardly sloping deflector D mounted upon the rotatable radial pipes 15 by brackets 25 and braced by struts 26 from the pipe 8, and so disposed as to pass under the lower end 24 of spout C—1. It is to be noted (Fig. 1) that the diameter of the inner edge D—1 of the deflector D is somewhat less than the diameter of the inner edge 2—a of the bottom 2.

The tank T is provided with a discharge pipe 27, located in the side of the tank T at a point slightly below the horizontal plane of the opening 7 of the casing 6. This pipe 27 has valve 28 and discharges on screen 29 below which is sump 30 connected by pipe 31 to pump P, the discharge end of which is connected with pipe 32 which discharges into spout C—1.

The discharge conduit 4 communicates with the lower end of casing 33 of the endless belt conveyor 34 driven by any suitable means. I provide a reservoir 35 communicating with the casing 33, in which is disposed the float 36 connected by rod 37 with lever 38 pivoted at 39 on reservoir 35 and having the slot-and-pin connection 40 with crank 41 operating valve 42 on a water-supply pipe 43 for supplying water to the reservoir 35.

In Fig. 5, there is illustrated a modified form of tank T—1 for use in my improved apparatus. In this form there is interposed between the bottom 2' and the bottom 3' an intermediate tubular portion 44.

Having described the details of construction of my improved apparatus I will now describe its use and operation in the practice of my improved method. The tank T and casing 33 are suitably supplied with water by pipe 22. The impeller 10, in the casing 6, being actuated by the motor M, induces a flow of water from tank T into the open end 7 of the casing 6, and therefrom through pipe 8, to head 14 and pipes 15 and out through nozzles 16 back into tank T. As is well known, the emission of the water from these nozzles 16 causes rotation of the head 14, thereby causing rotation therewith of head 18 and its nozzles 21. The rotation of head 14 and its pipes 15 causes rotation of deflector D passing below the open end 24 of the spout C—1. The mixed materials are delivered by the chute C to the spout C—1 and passing therethrough are received on the rotating deflector D. By the proper adjustment of the valve 23 on the pipe 22, a regulated current of clear water is supplied through pipe 22, head 18, pipes 19 and pipes 20 and nozzles 21. This current of clear water passes directly upwardly in a centrally disposed column passing through the bottom 1 and the circular lower edge D—1 of the deflector D. By reason of the inclination of the surface of the deflector D, the mixed materials fed thereon tend to move downwardly and inwardly encountering this upwardly moving column of clear water. The very light and fine particles of the mixed materials are carried upwardly and outwardly over the deflector D to the overflow launder 1 of the tank T. The heavy and coarse particles of the mixed materials pass downwardly through this column of clear water to the discharge conduit 4 and thence to the conveyor 34 by which they are discharged from the apparatus. The circulation of water through the tank T by the impeller 10 creates an upwardly flowing current, causing the light and coarse particles and the heavy and fine particles to move toward the circumference of the tank T, under the deflector D and upwardly. These light and coarse particles and heavy and fine particles, as a middling product, are discharged from the tank T through the pipe 27, onto the screen 29. The light and coarse particles are discharged over screen 29 to waste, and the heavy and fine particles, passing through screen 29, sump 30 and pipe 31, are returned by the pump P through the pipe 32 to the feed passing into the tank T through the spout C—1.

From the foregoing, the purpose of producing the middling product will be obvious. The middling product is composed of light and coarse particles and heavy and fine particles. The laws of settling determine this. Being coarse and fine, they may be separated by screening, as above described. If the fine particles are continually returned to the feed, eventually all the light and fine material will pass out of the tank T into the overflow launder 1, and all the heavy and fine material will pass out of the tank T through the discharge conduit 4.

Since the pipe 27, for the discharge of the middling product, is below the open end 7 of the casing 6 in which the impeller 10 operates, this middling product is produced by the combined effect of the upwardly flowing current of the liquid circulated by the impeller 10, the upwardly flowing current of clear water supplied by the pipe 22, and any additional water supplied to the tank T, with the feed through the spout C—1, and by the pipe 43 through reservoir 35, casing 33 and conduit 4. The overflow product into launder 1 is produced by only the water added with the feed and from the pipes 22 and 43. In the operation of my improved apparatus, in the practice of my improved method, I have had the following actual conditions: The impeller 10 circulated 500 gallons of liquid per minute through the tank T. Water was added with the feed through spout C—1, at 75 gallons per minute. Water was introduced into tank T, through pipe 22, at 140 gallons per minute, and through pipe 43, at 100 gallons per minute. Under these conditions, the overflow product was subject to the effect of 315 gallons per minute, being the total of flow through spout C—1, and pipes 22 and 43, while the middling product was subject to the effect of 815 gallons per minute, being the total of the aforesaid 315 gallons per minute and the 500 gallons per minute of the impeller 10. Under the conditions of operation, this flow of 315 gallons per minute caused a current having a velocity of 1.5 feet per minute to produce the overflow product, and this flow of 815 gallons per minute caused a current having a velocity of 4 feet per minute to produce the middling product.

Variations in the density of the fluid circulated in tank T, caused by fluctuations in the quantity and quality of the mixed materials being fed into tank T, result in variations of the flow of the current through conduit 4. If, due to an increase in the quantity of the underflow product in the feed, the density of the fluid is increased, the water level in the reservoir 35 is caused to rise, raising float 36 and thereby reducing the volume of water supplied to the apparatus from pipe 43. This results in a decrease in the velocity of the upwardly flowing current through pipe 4 into tank T, permitting faster discharge of the underflow product. If, however, due to a decrease in the quantity of the underflow product in the feed, the density of the fluid is decreased, the water level in the reservoir 35 falls, lowering the float 36 and thereby causing an increase in the volume of water supplied to the apparatus from pipe 43. This results in an increase in the velocity of the upwardly flowing current through pipe 4 into tank T, causing a retarding of the discharge of the underflow product from the tank T. It is obvious that this automatic control of the upwardly flowing current through pipe 4 produces the desired hydraulic separation in pipe 4, the current being increased when the overflow product increases with the decrease of the underflow product, and the current being decreased when the overflow product decreases with the increase of the underflow product. This operation of my apparatus secures the fully automatic control of the density of the fluid in the tank T, thereby producing under all operating conditions that desired degree of specific gravity of the fluid, so that it shall accurately and efficiently produce the desired separation of the overflow and underflow products.

It is obvious that the introduction of clear water into tank T through pipe 22, head 18, pipes 19 and 20 and nozzles 21, causing the upwardly flowing column of water above the bottom 3 of the tank T, and the confining of the current produced by the impeller 10 through the head 14, pipes 15 and nozzles 16, to the outer portion of the tank T, above the bottom 2, produce the desired vertical zoning in the tank T.

It has been demonstrated by actual use of my improved apparatus that the light and fine particles can be entirely excluded from the underflow product of the method. This desired result is produced by the use of the vertical zoning above described, which is the result of the operation of the deflector D and the construction whereby the column of clear water is caused to flow upwardly through the deflector D.

Having described my invention, what I claim is:

1. In an apparatus for separating mixed materials, the combination of a tank; means adapted to circulate liquid within said tank, having an inlet disposed in the upper portion of said tank and a series of outlets disposed in the lower portion of said tank; a discharge pipe opening from said tank at a point intermediate the said inlet and outlets; a spout to feed the mixed materials to said tank; and a rotatable inverted frusto-conical deflector plate so disposed in said tank as to receive thereon the feed from said spout.

2. In an apparatus for separating mixed materials, the combination of a tank having an annular inverted frusto-conical bottom, and a centrally disposed inverted conical bottom; a rotatable head disposed in said tank concentric with said bottoms; a series of pipes mounted radially on said head and having nozzles disposed adjacent said annular bottom; means adapted to supply liquid to said pipes to be ejected from said nozzles; an inverted frusto-conical feed deflector plate mounted upon said series of pipes; and a feed spout so disposed in said tank as to supply the mixed materials to said plate.

3. In an apparatus for separating mixed materials, the combination of a tank having an annular inverted frusto-conical bottom, and a centrally disposed inverted conical bottom; a rotatable head disposed in said tank concentric with said bottoms; a series of pipes mounted radially on said head and having nozzles disposed adjacent said annular bottom; means adapted to supply liquid to said pipes to be ejected from said nozzles; a second rotatable head disposed in said tank concentric with said first head; a second series of pipes mounted radially on said second head and having nozzles disposed adjacent said centrally disposed bottom; means adapted to supply liquid to said second series of pipes to be ejected from their nozzles; an inverted frusto-conical feed deflector plate mounted on said first series of pipes; and a feed spout so disposed in said tank as to supply the mixed materials to said plate.

4. In an apparatus for separating mixed materials, the combination of a tank; means adapted to circulate liquid within said tank, having an inlet disposed in the upper portion of said tank and a series of outlets disposed in the lower portion of said tank; a discharge pipe opening from said tank at a point intermediate the said inlet and outlets; a screen adjacent said tank, the discharge end of said pipe being disposed above said screen; a sump below said screen; a pump having its inlet communicating with said sump; a spout to feed the mixed materials to said tank; a pipe connecting the outlet of said pump with said spout; and a rotatable inverted frusto-conical deflector plate so disposed in said tank as to receive thereon the feed from said spout.

5. In an apparatus for separating mixed materials, the combination of a tank; a spout to feed the mixed materials to said tank; a rotatable inverted frusto-conical deflector plate, having a central discharge opening, and so disposed in said tank as to receive therein the feed from said spout; a series of nozzles disposed in the bottom of said tank; and a pipe entering said tank and connected with said nozzles, adapted to supply a current of water through said nozzles to flow upwardly through said discharge opening of said plate.

6. In an apparatus for separating mixed materials, the combination of a tank; means adapted to circulate liquid within said tank, having an inlet disposed in the upper portion of said tank and a series of outlets disposed in the lower portion of said tank; a discharge pipe opening from said tank at a point intermediate the said inlet and outlets; a screen adjacent said tank, the discharge end of said pipe being disposed above said screen; a sump below said screen; a pump having its inlet communicating with said sump; a spout to feed the mixed materials into said tank; a pipe connected with the outlet of said sump and with said spout; a rotatable inverted frusto-conical deflector plate so disposed in said tank as to receive thereon the feed from said spout; a series of nozzles disposed in the bottom of said tank; and a pipe entering said tank and connected with said nozzles, adapted to supply a current of water through said nozzles to flow upwardly through said plate.

7. In an apparatus for separating mixed materials, the combination of a tank; means adapted to circulate liquid within said tank, having an inlet disposed in the upper portion of said tank, and a series of outlets disposed in the lower portion of said tank; a discharge pipe opening from said tank at a point intermediate the said inlet and the said outlets; means to feed the mixed materials into said tank; and a rotatable inverted frusto-conical deflector plate mounted on said circulating means intermediate the said inlet and the said outlets, and so disposed in said tank as to receive the feed thereon.

8. In an apparatus for separating mixed materials, the combination of a tank; means to feed the mixed materials into said tank; a rotatable inverted frusto-conical deflector plate having a central discharge opening, so disposed in said tank as to receive the feed thereon; and means adapted to supply a current of water to flow upwardly through said discharge opening.

9. In an apparatus for separating mixed materials, the combination of a tank; a rotatable head disposed in said tank; a series of pipes radially mounted on said head and having nozzles disposed adjacent the bottom of the tank; means adapted to supply liquid to said pipes to be ejected from said nozzles; a rotatable inverted frusto-conical deflector plate mounted on said pipes; and means adapted to feed the mixed materials to said plate.

10. In an apparatus for separating mixed materials, the combination of a tank, having its bottom divided into a circular central portion and an outer annular portion; a series of nozzles rotatably mounted and disposed adjacent said annular portion; a second series of nozzles rotatably mounted and disposed adjacent said central portion; means adapted to supply liquid to be ejected from said nozzles; a rotatable inverted frusto-conical deflector plate disposed above said annular portion and having a central discharge opening concentric with and of the same diameter as the central bottom portion; and means to feed the mixed materials to said plate.

11. The method of separating mixed materials which comprises producing two upwardly flowing concentric currents of liquid of different velocities, the current of less velocity being centrally disposed, and the current of greater velocity surrounding the current of less velocity, feeding the mixed materials into the upper portion of the centrally disposed current, discharging the overflow product with the overflow of the current of less velocity, discharging the underflow product from the lower end of the current into which it is fed, causing the middling product to pass from the current of less velocity to the current of greater velocity, discharging the middling product, sizing the middling product by screening, discharging the particles on the screen to waste, and returning the residue particles to the feed.

12. The method of separating mixed materials which comprises producing two upwardly flowing concentric currents of liquid of different velocities, the current of less velocity being centrally disposed, and the current of greater velocity surrounding the current of less velocity, feeding the mixed materials into the upper portion of the centrally disposed current, discharging the overflow product with the overflow of the current of less velocity, discharging the underflow product from the lower end of the current into which it is fed, causing the middling product to pass from the current of less velocity to the current of greater velocity, discharging the middling product, sizing the middling product by screening, discharging the particles on the screen to waste, returning the residue particles to the feed, supplementing the current of less velocity with a variable current supplied thereto, and controlling said variable current by the discharge of the underflow product.

13. The method of separating mixed materials which comprises circulating a constant quantity of liquid within a container so as to produce an upwardly flowing current of liquid spaced radially from the vertical axis of the container, creating an upwardly flowing current of liquid so introduced into said container at a constant rate of flow as to be disposed within said first mentioned current, feeding the mixed materials into the upwardly flowing current having the constant rate of flow, discharging the overflow product with the liquid discharged from the container, discharging the underflow product from the bottom of the container, causing the middling product to pass from the inner current to the outer current, discharging the middling product from the outer current, sizing the middling product by screening, discharging the particles on the screen to waste, and returning the residue particles to the feed.

14. The method of separating mixed materials which comprises circulating a constant quantity of liquid within a container so as to produce an upwardly flowing current of liquid spaced radially from the vertical axis of the container, creating an upwardly flowing current of liquid so introduced into said container at a constant rate of flow as to be disposed within said first mentioned current, feeding the mixed materials into the upwardly flowing current having the constant rate of flow, discharging the overflow product with the liquid discharged from the container, discharging the underflow product from the bottom of the container, causing the middling product to pass from the inner current to the outer current, discharging the middling product from the outer current, sizing the middling product by screening, discharging the particles on the screen to waste, returning the residue particles to the feed, introducing into and discharging from the container a current of liquid of varying rate of flow, and automatically controlling the rate of flow of said variable current by the discharge of the underflow product.

15. The method of separating mixed materials which comprises producing two upwardly flowing concentric currents of liquid of different velocities, the current of less velocity being centrally disposed, and the current of greater velocity surrounding the current of less velocity, feeding the mixed materials into the upper portion of the centrally disposed current, discharging the overflow product with the overflow of the current of less velocity, discharging the underflow product from the lower end of the current into which it is fed, causing the middling product to pass from the current of less velocity to the current of greater velocity, discharging the middling product from the current of greater velocity.

16. The method of separating mixed materials which comprises circulating a constant quantity of liquid within a container so as to produce an upwardly flowing current of liquid spaced radially from the vertical axis of the container, creating an upwardly flowing current of liquid so introduced into said container at a constant rate of flow as to be disposed within said first mentioned current, feeding the mixed materials into the upwardly flowing current having the constant rate of flow, discharging the overflow product with the liquid discharged from the container, discharging the underflow product from the bottom of the container, causing the middling product to pass from the inner current to the outer current, discharging the middling product from the outer current.

WALTER L. REMICK.